(12) United States Patent
Kammerer et al.

(10) Patent No.: US 10,364,032 B2
(45) Date of Patent: Jul. 30, 2019

(54) OVERHEAD LUGGAGE COMPARTMENT FOR AIRCRAFT

(71) Applicant: FACC AG, Ried im Innkreis (AT)

(72) Inventors: Bernhard Kammerer, Zell an der Pram (AT); Sandi Koletnik, Moerschwang (AT); Jakob Schoerkhuber, Geboltskirchen (AT); Christoph Kralovec, Linz (AT)

(73) Assignee: FACC AG, Ried im Innkreis (DE)

( * ) Notice: Subject to any disclaimer, the term of this patent is extended or adjusted under 35 U.S.C. 154(b) by 264 days.

(21) Appl. No.: 15/523,627

(22) PCT Filed: Dec. 10, 2015

(86) PCT No.: PCT/AT2015/050314
§ 371 (c)(1),
(2) Date: May 1, 2017

(87) PCT Pub. No.: WO2016/094916
PCT Pub. Date: Jun. 23, 2016

(65) Prior Publication Data
US 2017/0305551 A1    Oct. 26, 2017

(30) Foreign Application Priority Data
Dec. 15, 2014    (AT) .............................. A 50904/2014

(51) Int. Cl.
*B64D 11/00*    (2006.01)
*B64D 13/00*    (2006.01)

(52) U.S. Cl.
CPC ............ *B64D 11/003* (2013.01); *B64D 11/00* (2013.01); *B64D 2011/0053* (2013.01);
(Continued)

(58) Field of Classification Search
CPC .................................................... B64D 11/003
(Continued)

(56) References Cited

U.S. PATENT DOCUMENTS 4,275,942 A * 6/1981 Steidl ................... B64D 11/003
16/66
4,383,347 A * 5/1983 La Conte ............. B64D 11/003
16/360

(Continued)

FOREIGN PATENT DOCUMENTS

DE    102011105005 A1    12/2012
EP    0718189 A1    6/1996

(Continued)

OTHER PUBLICATIONS

ISA European Patent Office, International Search Report Issued in Application No. PCT/AT2015/050314, dated Feb. 5, 2016, WIPO, 4 pages.

(Continued)

*Primary Examiner* — Bret Hayes
(74) *Attorney, Agent, or Firm* — McCoy Russell LLP (57) ABSTRACT

The invention relates to an overhead luggage compartment for aircraft, comprising: a tray for accommodating pieces of luggage, which tray can be pivoted about an axis of rotation between a closed position and an open position; and comprising a housing, which encloses the tray in the closed position and which has devices arranged thereon for fastening to a supporting structure of the aircraft and has a suspension device for a passenger service unit; and comprising a closure element for holding the tray in the closed position. The housing is formed by two frame parts arranged lateral to the tray, which frame parts are connected to each other by means of cross-braces, and the fastening devices and the suspension device for the passenger service unit and (Continued)

at least one stop element for limiting the open position of the tray are arranged on the frame parts.

19 Claims, 7 Drawing Sheets

(52) U.S. Cl.
CPC .. *B64D 2013/003* (2013.01); *B64D 2231/025* (2013.01); *Y02T 50/46* (2013.01)

(58) Field of Classification Search
USPC ...................................................... 244/118.1
See application file for complete search history.

(56) References Cited

U.S. PATENT DOCUMENTS

| | | | | |
|---|---|---|---|---|
| 4,383,392 | A * | 5/1983 | La Conte | B64D 11/003 49/205 |
| 5,244,269 | A * | 9/1993 | Harriehausen | B60R 5/003 244/118.5 |
| 5,456,529 | A | 10/1995 | Cheung | |
| 5,549,258 | A * | 8/1996 | Hart | B64D 11/003 244/118.1 |
| 6,045,204 | A * | 4/2000 | Frazier | B64D 11/003 16/370 |
| 6,318,671 | B1 * | 11/2001 | Schumacher | B64D 11/003 244/118.5 |
| 8,783,609 | B2 * | 7/2014 | Schneider | B64D 11/003 244/118.1 |
| 9,856,022 | B2 * | 1/2018 | Schmitz | B64D 11/003 |
| 2006/0237585 | A1 | 10/2006 | Lau et al. | |
| 2008/0078871 | A1 | 4/2008 | Munson et al. | |
| 2013/0119200 | A1 | 5/2013 | Graf et al. | |
| 2016/0075433 | A1 * | 3/2016 | Eakins | B64D 11/003 701/49 |
| 2016/0297523 | A1 * | 10/2016 | Walton | B64F 5/10 |

FOREIGN PATENT DOCUMENTS

| | | |
|---|---|---|
| EP | 0983938 A2 | 3/2000 |
| EP | 1434713 B1 | 3/2005 |
| EP | 1803645 A1 | 7/2007 |
| WO | 2005054054 A1 | 6/2005 |
| WO | 2014117198 A1 | 8/2014 |

OTHER PUBLICATIONS

International Bureau of WIPO, International Preliminary Report on Patentability Issued in Application No. PCT/AT2015/050314, dated Jun. 29, 2017, WIPO, 6 pages.

* cited by examiner

OVERHEAD LUGGAGE COMPARTMENT FOR AIRCRAFT

CROSS-REFERENCE TO RELATED APPLICATIONS

The present application is a U.S. National Phase of International Patent Application Serial No. PCT/AT2015/050314 entitled "OVERHEAD LUGGAGE COMPARTMENT FOR AIRCRAFT," filed on Dec. 10, 2015. International Patent Application Serial No. PCT/AT2015/050314 claims priority to Austrian Patent Application No. A 50904/2014, filed on Dec. 15, 2014. The entire contents of each of the above-referenced applications are hereby incorporated by reference for all purposes.

TECHNICAL FIELD

The invention relates to an overhead luggage compartment for aircraft, comprising a tray for accommodating pieces of luggage, which tray can be pivoted about an axis of rotation between a closed position and an open position, and comprising a housing, which encloses the tray in the closed position and which has devices arranged thereon for fastening to a supporting structure of the aircraft and has a suspension device for a passenger service unit, and comprising a closure element for holding the tray in the closed position.

BACKDROUND AND SUMMARY

The present invention primarily relates to overhead luggage compartments for passenger aircraft. An application in rail vehicles or other transport means adapted for passenger transport, for example ships, is also conceivable though.

In the overhead luggage compartments for aircraft a distinction is made between fixed luggage compartments (fixed bins) with a fixed housing and a pivoting cover and movable luggage compartments (movable bins) with a lowerable tray or chute and a covering or a housing. In most cases such overhead luggage compartments are made of composite materials made of fiber-reinforced plastic and a honeycomb core in a lightweight construction. The movement of the cover in the fixed overhead luggage compartments and the movement of the tray in the movable luggage compartments usually take place manually, the movement being supported by force-supporting elements on a case-by-case basis. In particular, in the case of very large overhead luggage compartments having a large volume for accommodating pieces of luggage, an electric support of the movement is advantageous or even necessary.

The present invention relates to movable overhead luggage compartments (movable bins), which can be moved into the open position and the closed position either manually or by means of an electric drive.

WO 2014/117198 A1 describes overhead luggage compartments, in particular for smaller passenger aircraft comprising only one aisle and overhead luggage compartments arranged on both sides of the aisle, which can be implemented as both fixed and movable luggage compartments. Constructions of overhead luggage compartments, which are very stable and robust despite of their low dead weight and can be produced in a fairly simple matter, are described in e. g. EP 1 434 713 B1 or WO 2005/054054 A1.

The U.S. Pat. No. 5,456,529 A describes a powered overhead stowage bin, comprising a lowerable tray for accommodating the pieces of luggage, the housing enclosing the tray being made of corresponding plates.

The US 2013/0119200 A1 describes an electrically operable, movable overhead package holder for aircraft, comprising a tray of the present type that can be pivoted between a closed position and an open position, the housing enclosing the tray being made of sidewalls and corresponding cover layers.

It is the object of the invention to provide an above cited overhead luggage compartment, having the lowest possible weight and at the same time a greatest possible stability and strength and a greatest possible volume for accommodating the pieces of luggage, and at the same time, however, having a lowest possible overall height, so that below the overhead luggage compartment as much free space or headroom as possible is given for the passengers seated underneath the luggage compartments. Assembly and disassembly of the overhead luggage compartment is to be possible as rapidly and easily. Disadvantages of known overhead luggage compartments are to be avoided or at least reduced.

The object according to the invention is achieved in that the housing is formed by two frame parts arranged lateral to the tray, which frame parts are connected to each other by means of cross-braces, and the fastening devices and the suspension device for the passenger service unit and at least one stop element for limiting the open position of the tray are arranged on the frame parts.

In accordance with the invention, instead of the conventional housing made of composite material, a construction of two frame parts is provided, which are connected to each other by means of cross-braces. Thereby, a reduction of the weight of the overhead luggage compartment and also a reduction of the overall height can be achieved, with the accommodating volume staying the same or even increasing. In the usual arrangement of overhead luggage compartments one next to the other a frame part can be used according to the invention for accommodating the trays of two overhead luggage compartments. This may save even more overall weight and make room for the pieces of luggage, because the trays of two neighboring overhead luggage compartments are accommodated only by one frame part. Due to the omission of a classic housing assembly may also be simplified and accelerated, since the weight of the housing according to the invention as against classic housings is reduced and, in addition, accessibility is improved. The housing formed by the two frame parts and cross-braces includes all devices for fastening to a supporting structure of the aircraft and also a suspension device for fastening a passenger service unit (PSU), which contains the reading lamps/air-conditioning openings and oxygen masks for the passengers seated underneath. The stop elements, which are likewise arranged on the frame parts for limiting the open position of the tray, limit the movement of the tray in the open position.

The axis of rotation is advantageously arranged outside the tray. This feature offers advantages with respect to the kinematics of the movable tray. In addition, due to this the overall center of gravity of the overhead luggage compartment is located closer to the supporting structure of the aircraft, compared with conventional overhead luggage compartments. The arrangement of the axis of rotation and the construction of the overhead luggage compartment together with the frame parts, the PSU unit, the simpler connection closer to the structure and the saving in space in a Y-direction lead to larger stand room or headroom for the passengers.

If at least one cross-brace is arranged above the tray and at least one cross-brace is arranged behind the tray, an optimum stability of the housing can be achieved. On the cross-brace arranged behind the tray an additional fixed point or bearing point may be provided in very long designs of the overhead luggage compartment.

The frame parts and the cross-braces may be made of metal or fiber-reinforced plastic composite material. In the case of metals, in particular light metals such as aluminum and aluminum alloys are suitable. When produced from fiber reinforced plastic composite material, reinforcement fibers made of different materials, in particular carbon, glass or aramide are suitable. For example, the production may take place according to the RTM method (resin transfer molding). By using such materials a high stability can be achieved despite a very low weight.

Damping elements can be arranged between the tray and at least one frame part, which dampens the movement of the tray from the open position to the closed position and vice versa. The damping elements may be designed in different manners and are positioned on the location suited therefore.

The passenger service unit is preferably arranged between the suspension device and a mounting rail fastened to the supporting structure of the aircraft. Due to the fact that the passenger service unit is arranged between the overhead luggage compartment and the aircraft fuselage, on the one hand mounting of the overhead luggage compartment and also of the passenger service unit is facilitated, on the other hand, however, also the height available beneath the overhead luggage compartment and thus the comfort for the passengers is increased.

Advantageously, an electric motor transmission unit for moving the tray about the axis of rotation between the closed position and the open position is provided.

According to a feature of the invention the electric motor transmission unit is arranged on a frame part and connected to a hollow shaft running along the tray, which hollow shaft is connected to the tray via corresponding connecting elements. Connecting elements may be realized e. g. by ropes or bands. Due to such a construction of the electric drive for operating the movable overhead luggage compartment a good force transmission can be achieved and twisting of the tray in particular in very large overhead luggage compartments can be prevented.

The tray is formed of two sidewalls, a bottom, a rear wall and a cover wall. Usually the components of tray are made of fiber reinforced plastic and honeycomb cores in lightweight construction. Due to the fact that the tray is connected exclusively on its outside to the frame parts, the inside of the tray can be constructed so as to be free from fastening components and the like and with a smooth and visually appealing surface. Since the tray is operated by means of the electric drive, no spring elements are necessary in the tray. This provides a greater volume for accommodating pieces of luggage.

If the bottom of the tray is designed in double, an increased loading capacity of the tray and an optimum surface both inside the tray and on the bottom side of tray may be provided. In the space, which is available between the at least two bottom elements in any case, lines or cables may be installed.

The sidewalls of the tray are designed to be smooth at least in the area visible in the open position of the tray. This results in a particularly appealing design.

The tray may be between 1.5 and 2.5 m long, that is in aircraft it may extend over four so-called frames of the supporting structure of the aircraft, which frames are usually 0.5 m apart from one another. By using especially long trays or overhead luggage compartments the entire available space for the pieces of luggage is increased.

Advantageously, a cover plate is arranged above the tray between the frame parts, which covers the opening of tray in the closed condition. Additionally, the cover plate is also used for design purposes of the aircraft cabin and forms the transition to a ceiling panel designed accordingly.

A seat row lettering may be arranged on the outside of the cover plate arranged between the frame parts. Arranging the usual seat row lettering in such a way, which can be illuminated in any case, allows for good visibility in the open position and in the closed position of the tray. As compared to the prior art, where frequently two seat row letterings per seat row are necessary, here only one seat row lettering is necessary.

Furthermore, a handrail or the like may be arranged on the tray of the overhead luggage compartment. Such a handrail in the form of a recess horizontally extending on the outside of the tray for the fingers of passengers or the cabin crew makes walking easier during the flight. Instead of the handrail or the like also an optical interruption on the outside of the tray may be realized as a design element of the interior design of the passenger cabin.

If sealing elements for sealing the gap between the frame part and the sidewall of the tray in the open position and the closed position of the tray are arranged on the frame parts, on the one hand, sealing of the gap may be achieved for a better look, and on the other hand, requirements made by the authorities with respect to hiding objects may be complied with in a particularly good manner. For example, according to certain security policies all possible hiding places for objects must be checked prior to the flight. Due to the sealing elements of the present type the hiding places can be reduced and thus the examination times can be diminished.

Devices for the fastening of ceiling panels are preferably integrated on the frame parts. Such already integrated fastening devices make it easier to assemble the ceiling panels and reduce the overall weight even further.

If the at least one stop element for limiting the open position of the tray is adjustably designed, a tolerance compensation can be effected in a quick and easy manner.

Finally, it is of advantage if at least one stop element is designed so as to be detachable, to make it possible for the maintenance personnel to find access behind the tray to the areas above the passenger service unit and to the supporting structure of the aircraft. Detaching or releasing of two stop elements of two opposite frame parts can be carried out very quickly by appropriately trained personnel, at best with the help of special tools, and the tray can be pivoted beyond the open position in order to obtain access to the area behind the tray of the overhead luggage compartment.

A light barrier or the like for avoiding an electrically operated movement into the closed position in the case of any projecting parts may be arranged in the tray. Such a light barrier or the like is preferably coupled directly to the electric motor transmission unit for actuating the overhead luggage compartment, so that in the case a light beam is blocked the closing process can be interrupted immediately and hurting of passengers or destroying of pieces of luggage can be avoided. An air-filled hose may also be used instead of an electro-optical sensor, on whose ends corresponding pressure sensors or the like are arranged, which detect a deformation of the hose and thus an increase in pressure.

Furthermore, a limit switch is advantageously arranged on the tray, which is connected to the electric motor transmission unit. Due to such a limit switch, which can be designed as a mechanical as well as a non-contact switch, for example, an electro-optical switch, a safe switching-off of the electric motor can be obtained upon reaching the open and/or closed position.

BRIEF DESCRIPTION OF THE FIGURES

The present invention will be described in more detail with reference to the enclosed drawings, in which.

DETAILED DESCRIPTION

Figure 1:
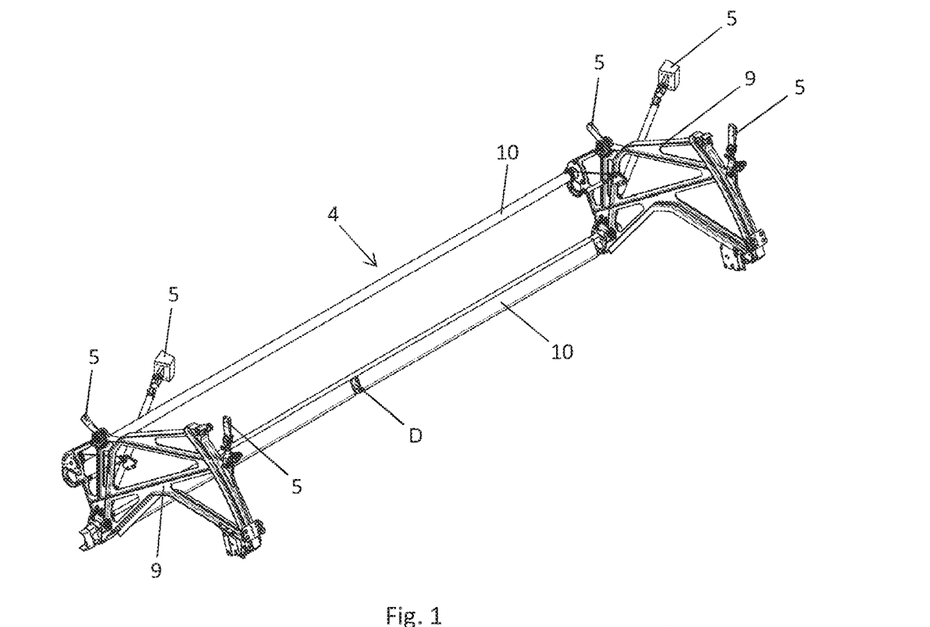
FIG. 1 shows a perspective view of a part of an overhead luggage compartment designed according to the invention.

FIG. 1 shows a perspective view of a part of an overhead luggage compartment 1 according to the present invention, whereby the usually present housing 4 is formed by two frame parts 9, which frame parts 9 are connected to one another via cross-braces 10. The devices 5 for fastening the overhead luggage compartment 1 to a supporting structure S (cf. FIGS. 6 and 8) of the aircraft F are arranged on the frame parts 9. The tray 3 is arranged between the frame parts 9, as can be seen from the following FIG. 2. In the case of longer designs of the overhead luggage compartment 1, an additional pivot point D can be provided on the cross-brace 10 arranged behind the tray 3.

Figure 2:
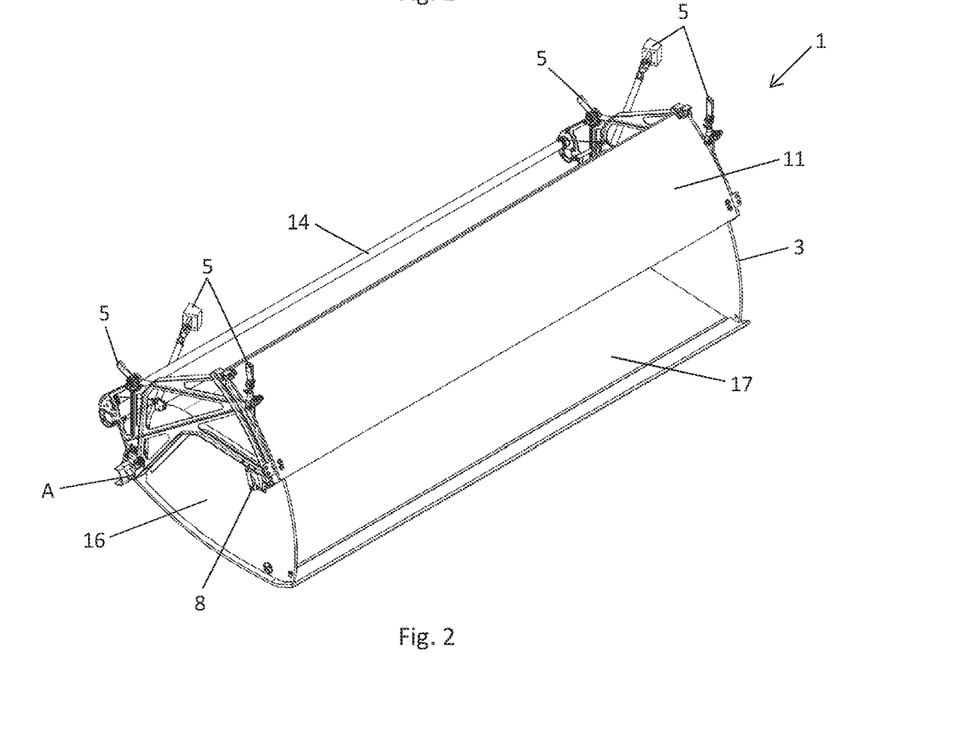
FIG. 2 shows a perspective view of an embodiment of an overhead luggage compartment in the closed position of the tray.

FIG. 2 shows a perspective view of an embodiment of an overhead luggage compartment 1 according to the present invention with open position of the tray 3. A cover plate 11 can be provided above or in front of the tray 3 between the frame parts 9. This cover plate 11 closes the opening of the tray 3 in the closed position and forms a corresponding transition between the tray 3 of the overhead luggage compartment 1 and the remaining interior design of the aircraft cabin, in particular the ceiling panel (cf. FIG. 8). The axis of rotation A, about which the tray 3 moves between the closed position and the open position, is arranged outside of the tray 3. The tray 3 is held in the closed position by a closure element 8. The tray 3 consists of sidewalls 16, a ceiling wall 18 (cf. FIG. 4A) a bottom 17 and a rear wall 22 (cf. FIG. 4A).

Figure 3:
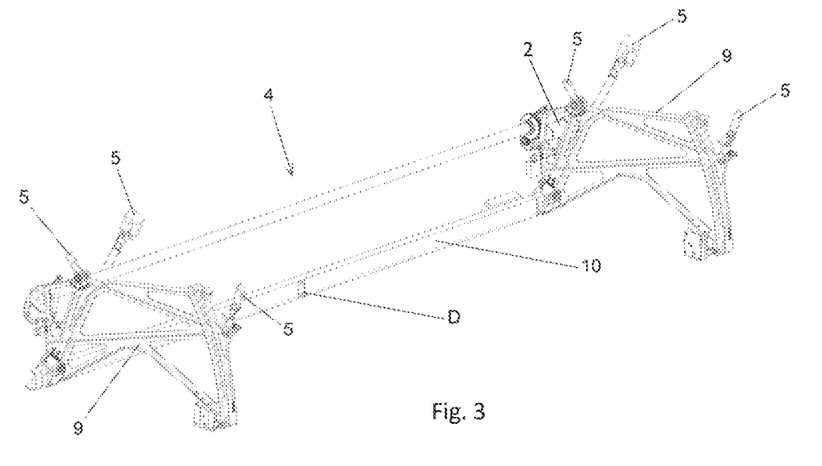
FIG. 3 shows a perspective view of a part of the overhead luggage compartment designed according to the invention, comprising an electric motor transmission unit.

FIG. 3 shows a variant of the invention, whereby as opposed to the embodiment according to FIG. 1 an electric motor transmission unit 2 is provided for moving of the tray 3 about the axis of rotation A (cf. FIG. 4A) between the closed and the open position.

Figure 4A:
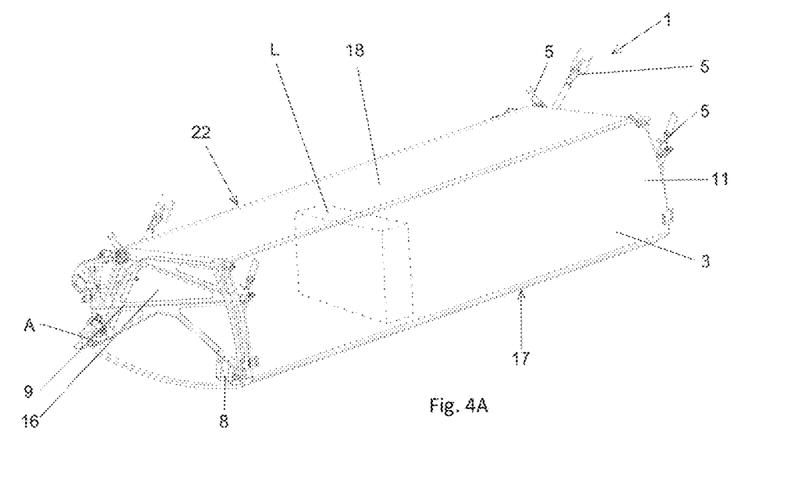
FIG. 4A shows a perspective view of an embodiment of an overhead luggage compartment comprising an electric motor transmission unit, with closed position of the tray.
Figure 4B:
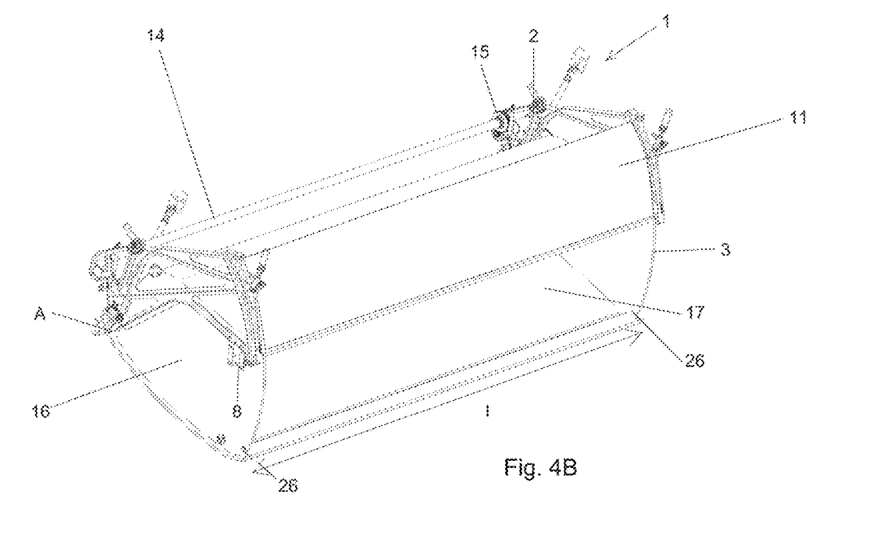
FIG. 4B shows a perspective view of the overhead luggage compartment according to FIG. 4A, with open position of the tray.

In FIGS. 4A and 4B the overhead luggage compartment 1 according to FIG. 3 is shown in the closed position and the open position of the tray 3. In the closed position of the tray 3 the cover plate 11 closes the opening of the tray 3 and forms an appealing transition between the tray 3 of the overhead luggage compartment 1 and the remaining interior design of the aircraft cabin.

In FIG. 4B the overhead luggage compartment 1 according to FIG. 4A is shown in the open position of the tray 3. The tray 3 is pivoted downwards about the axis of rotation A, whereby the opening of the tray 3 is arranged below the cover plate 11 and thus allows loading and unloading.

Figure 5A:
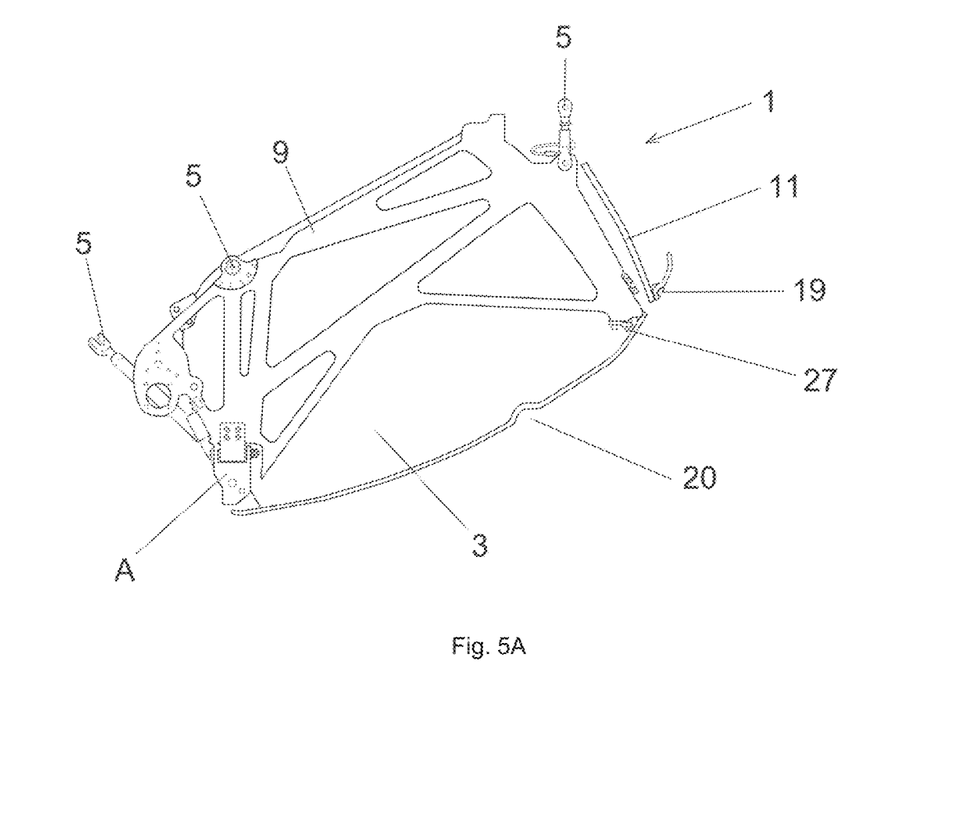
FIG. 5A shows a side view of the overhead luggage compartment, with closed position of tray.

FIG. 5A shows a side view of the overhead luggage compartment 1, with closed position of the tray 3. The electrically operable, movable overhead luggage compartment 1 comprises an electric motor 2 (cf. FIG. 4B) for transferring the pivotable tray 3 between a closed position (cf. FIG. 4A) and an open position (cf. FIG. 4B). The tray 3 is designed for accommodating pieces of luggage L (cf. FIG. 4A) or the like. The volume for accommodating the pieces of luggage L is to be as large as possible, whereas the overall weight of the overhead luggage compartment 1 is to be as low as possible. The overall height of the overhead luggage compartment 1 also is to be as small as possible to make available as much space as possible for the passengers underneath the overhead luggage compartment 1. The tray 3 is enclosed by an housing 4 (cf. FIG. 1) in the closed position. The housing 4 has devices 5 arranged thereon for fastening to a supporting structure S of the aircraft F (cf. FIG. 8) In addition the closure 4 comprises suspension devices 6 for the passenger service unit 7 (cf. FIG. 6), comprising the reading lamps/ventilation openings and oxygen masks for the passengers. In accordance with the invention the housing 4 is formed by two frame parts 9 arranged lateral to the tray 3, which frame parts 9 are connected to each other via cross-braces 10 (cf. FIG. 1) A closure element 8 (cf. FIG. 2) may serve to hold the tray 3 in the closed position. For dampening the movement of the tray 3 damping elements 12 (cf. FIG. 5B) can be arranged at appropriate locations. A high reduction in weight can be achieved by designing the housing 4 according to the invention with two frame parts 9 and cross-braces 10. On the condition that the tray 3 is manufactured with a sufficient strength, a length l (cf. FIG. 4B of the tray between 1.5 and 2.5 m can be achieved, that is over four so-called frames of an aircraft structure. The interior of the tray 3, which usually is formed of two sidewalls 16, a bottom 17 and a corresponding rear and ceiling wall 18, is free of mounting parts and thus can be configured with a particularly large volume for pieces of luggage L.

Figure 5B:
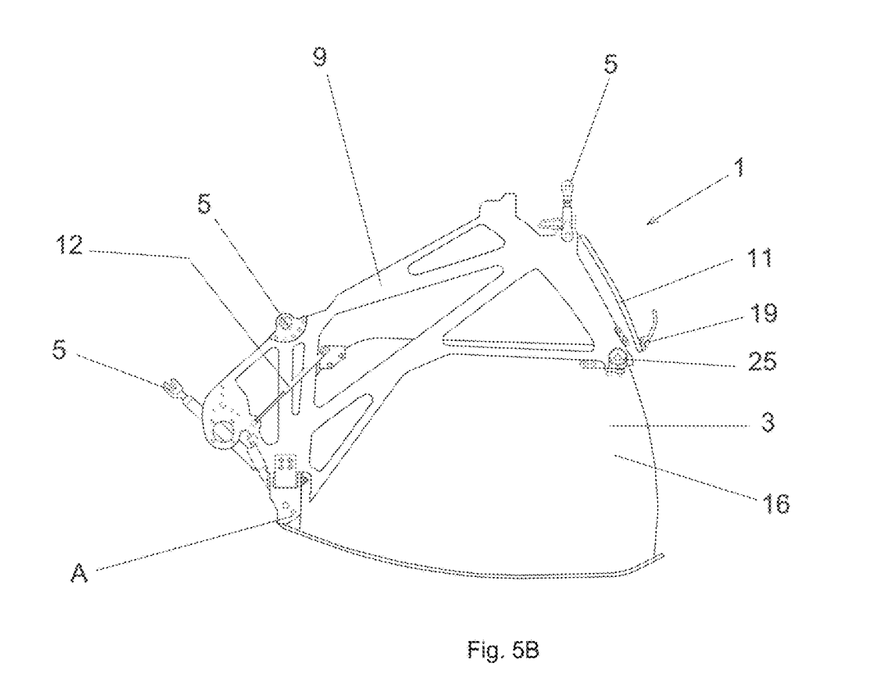
FIG. 5B shows a side view of the overhead luggage compartment according to FIG. 3, with open position of the tray.

FIG. 5B shows the side view of the overhead luggage compartment 1 according to FIG. 3 in the open position of the tray 3. The opening of the tray 3 beneath the cover plate 11 is exposed and thus allows loading and unloading of the tray 3.

According to the invention the rotation axis A is preferably arranged outside the tray 3, such as is better recognizable from FIGS. 5A and 5B. For obtaining a sufficient stability of the housing 4, preferably two cross-braces are provided, one above the tray 3 and one behind the tray 3.

The frame parts 9 and the cross-braces 10 can be made of metal, preferably aluminum or an aluminum alloy or of a fiber-reinforced plastic composite material, preferably in the RTM method (resin transfer molding). The sidewalls 16, the ceiling wall 18 and the rear wall 22 of the tray 3 can be made so as to be relatively thin and light in weight, since no load rests on them, whereas the bottom 17 of the tray 3 may have an accordingly reinforced and even double design. A seat row lettering 19 may be arranged on the outside of the cover plate 11. In addition, the surface of the tray 3 may include a handrail 20 or the like.

In FIGS. 5A and 5B also the stop element 25 can be seen on the frame part 9, which effects a limitation of the open position of the tray 3. Tolerances can be compensated by means of adjusting the stop element 25. If the stop element on each frame part 9 is detachable or unlockable, opening the tray 3 going beyond the open position for maintenance reasons can be achieved.

Figure 6:
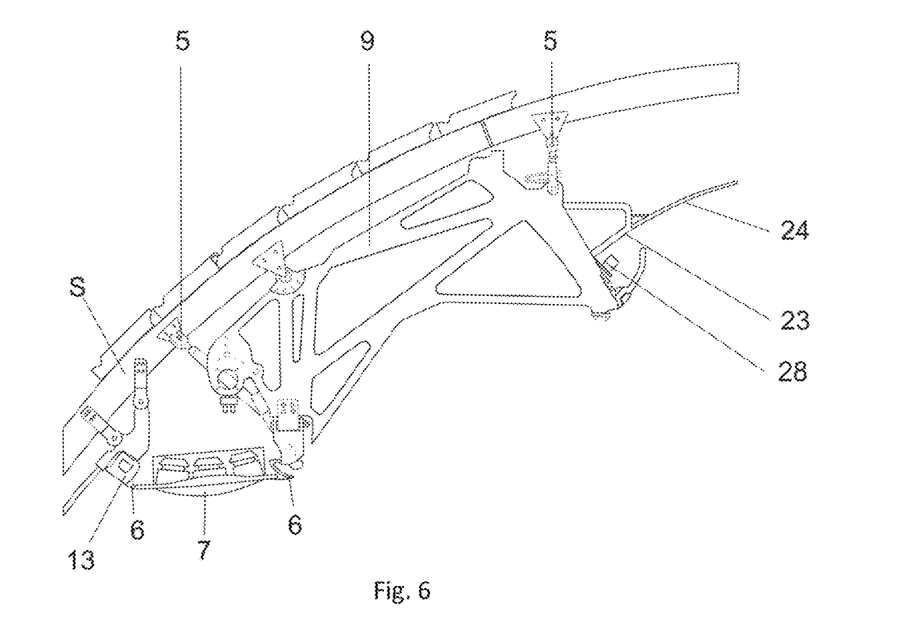
FIG. 6 shows a side view of the housing and the ceiling panel arranged thereon and the passenger service unit.

FIG. 6 shows a side view of the frame part 9 of the overhead luggage compartment 1 according to the invention, which is fastened to the supporting structure S, and the ceiling panel 24 arranged thereon and the passenger service unit 7. Here, the suspension device 6 on the frame part 9 for suspending the passenger service unit 7 is visible. In addition, corresponding fastening devices 23 for fastening the ceiling panels 24 are arranged on or integrated in the frame parts 9. The passenger service unit 7 can be fastened especially easily between the suspension device 6 of the frame part 9 and a mounting rail 13 arranged on the supporting structure S of the aircraft F. Due to the fact that the passenger service unit 7 is not arranged as usual below the overhead luggage compartment but between the latter and the aircraft fuselage, and due to the further construction features of the overhead luggage compartment 1, the overall height of the overhead luggage compartment 1 can be reduced and thus the headroom or stand room beneath the overhead luggage compartment 1 can be increased. The overall construction of the electrically operable, movable overhead luggage compartment 1 also makes possible a simple arrangement of ventilation lines and the cabin lighting 28. In addition, reduced tolerances and an improved appearance of the gaps are obtainable. A tolerance compensation can be achieved quite easily by adjusting the fastening devices 5.

Figure 7A:
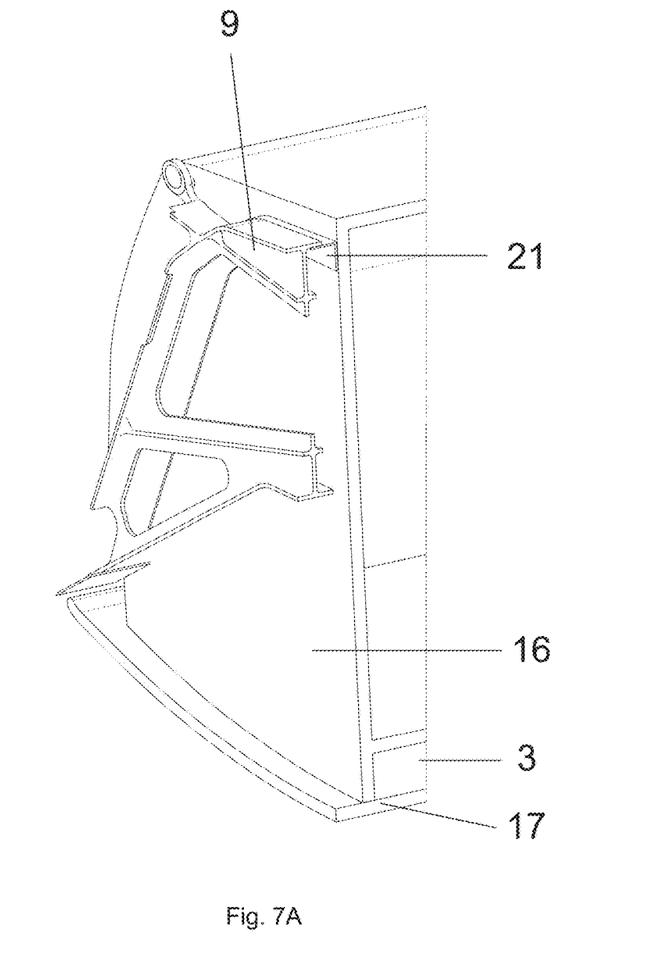
FIG. 7A shows a detailed view of the side of an overhead luggage compartment comprising sealing elements; with closed position of the tray.
Figure 7B:
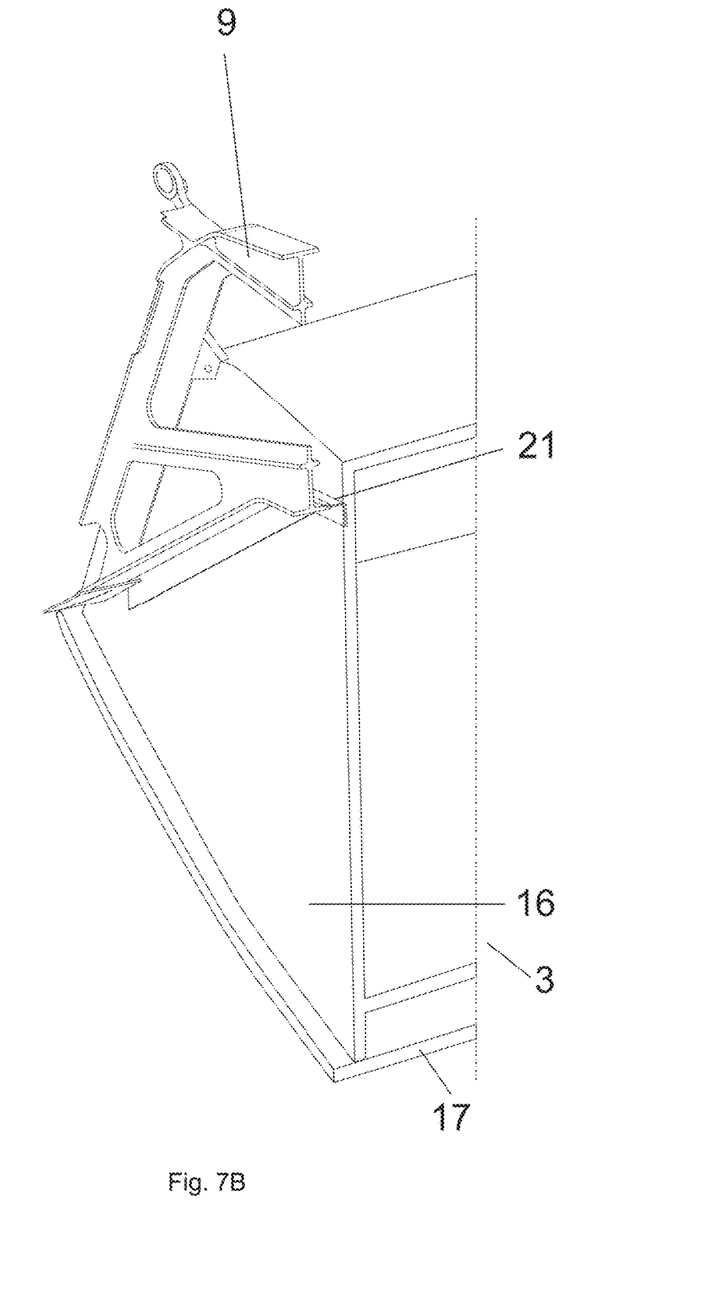
FIG. 7B shows a detailed view of the side of an overhead luggage compartment with sealing elements, with open position of the tray.

FIGS. 7A and 7B show a detailed view of the sidewall 16 of the tray 3 of an overhead luggage compartment 1 with sealing elements 21 for sealing the gap between the frame part 9 and the sidewall 16 of the tray 3. Sealing elements 21 are arranged outside of the sidewalls 16 of the tray 3, which seal the gap between the frame part 9 and the sidewall 16 of the tray 3 both in the closed position (FIG. 7A) and in the open position (FIG. 7B) of the tray 3. The sealing elements 21 are made of a correspondingly elastic plastic material.

Figure 8:
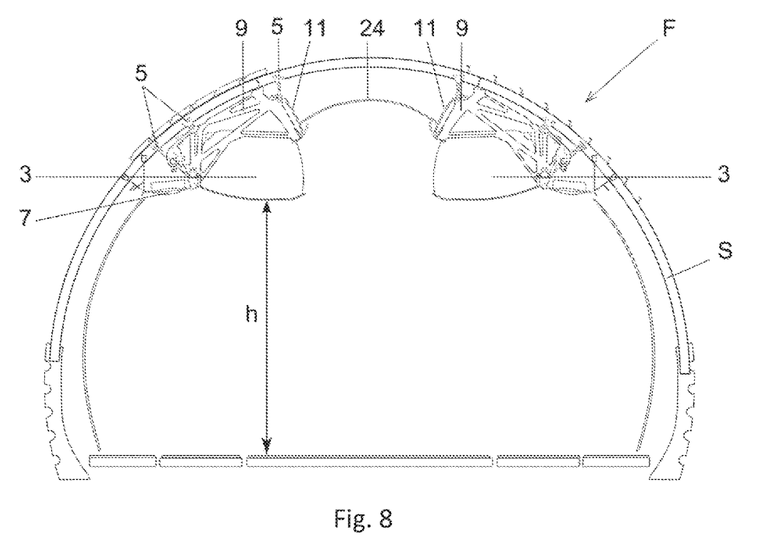
FIG. 8 shows a cross-section through a part of the fuselage of an aircraft, comprising overhead luggage compartments according to the present invention arranged thereon.

Finally, FIG. 8 shows a cross-section through a part of the fuselage of an aircraft F with overhead luggage compartments 1 according to the invention arranged thereon. The stand room h underneath the overhead luggage compartments 1 is particularly large due to the construction and the low construction height of the overall system, with at the same time a particularly large volume for accommodating the pieces of luggage L, whereby the passenger comfort can be increased.

The invention claimed is:

1. An overhead luggage compartment for an aircraft, comprising a tray for accommodating pieces of luggage, which tray is pivotable about an axis of rotation between a closed position and an open position, and comprising a housing, which encloses the tray in the closed position and has devices arranged thereon for fastening to a supporting structure of the aircraft, and a suspension device for a passenger service unit, and comprising a closure element for holding the tray in the closed position, wherein the housing is formed by two frame parts arranged lateral to the tray, which frame parts are connected to each other by means of cross-braces, and the fastening devices and the suspension device for the passenger service unit and at least one stop element for limiting the open position of the tray are arranged on the frame parts.

2. The overhead luggage compartment according to claim 1, wherein the axis of rotation is arranged outside the tray.

3. The overhead luggage compartment according to claim 1, wherein at least one cross-brace is arranged above the tray and at least one cross-brace is arranged behind the tray.

4. The overhead luggage compartment according to claim 1, wherein the frame parts and the cross-braces are made of metal or a fiber-reinforced plastic composite material.

5. The overhead luggage compartment according to claim 1, wherein damping elements are arranged between the tray and at least one frame part.

6. The overhead luggage compartment according to claim 1, wherein the passenger service unit is arranged between the suspension device and a mounting rail fastened to the supporting structure of the aircraft.

7. The overhead luggage compartment according to claim 1, wherein an electric motor transmission unit for moving the tray about the axis of rotation between the closed position and the open position is provided.

8. The overhead luggage compartment according to claim 7, wherein the electric motor transmission unit is arranged on a frame part and is connected to a hollow shaft running along the tray, which hollow shaft is connected to the tray via a transmission.

9. The overhead luggage compartment according to claim 7, wherein in the tray a light barrier or the like is arranged for avoiding movement into the closed position in the case of any projecting parts.

10. The overhead luggage compartment according to claim 7, wherein a limit switch is arranged on the tray, which is connected to the electric motor transmission unit.

11. The overhead luggage compartment according to claim 1, wherein the tray is formed of two sidewalls, a bottom, a rear wall and a cover wall.

12. The overhead luggage compartment according to claim 11, wherein the bottom of the tray is designed in double.

13. The overhead luggage compartment according to claim 11, wherein the side walls of the tray are designed so as to be smooth at least in the area visible in the open position of the tray.

14. The overhead luggage compartment according to claim 11, wherein the tray is between 1.5 and 2.5 meters long.

15. The overhead luggage compartment according to claim 11, wherein sealing elements are arranged on the sidewall of the tray which are intended for sealing the gap between the frame part and the sidewall of the tray in the open position and the closed position of the tray.

16. The overhead luggage compartment according to claim 1, wherein a seat row lettering is arranged on the outside of a cover plate arranged between the frame parts.

17. The overhead luggage compartment according to claim 1, wherein on the tray a handrail or the like is arranged.

18. The overhead luggage compartment according to claim 1, wherein devices for mounting ceiling panels are integrated in the frame parts.

19. The overhead luggage compartment according to claim 1, wherein the at least one stop element is implemented so as to be adjustable and/or detachable.

* * * * *